(12) United States Patent
Gajjala et al.

(10) Patent No.: US 12,348,400 B2
(45) Date of Patent: Jul. 1, 2025

(54) SYSTEMS AND METHODS FOR LINK AGGREGATION GROUP TESTING

(71) Applicant: VIAVI SOLUTIONS INC., San Jose, CA (US)

(72) Inventors: Anand Gajjala, Herndon, VA (US); Xiaoli Jiang, Gaithersburg, MD (US); Michael Scott Koller, Gaithersburg, MD (US); Michael Bangert, Kensington, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 383 days.

(21) Appl. No.: 17/726,593

(22) Filed: Apr. 22, 2022

(65) Prior Publication Data
US 2022/0345392 A1 Oct. 27, 2022

Related U.S. Application Data

(60) Provisional application No. 63/178,883, filed on Apr. 23, 2021.

(51) Int. Cl.
*H04L 43/50* (2022.01)
*H04L 43/0829* (2022.01)

(52) U.S. Cl.
CPC .......... *H04L 43/50* (2013.01); *H04L 43/0829* (2013.01)

(58) Field of Classification Search
CPC ............. H04L 43/0829; H04L 43/0858; H04L 43/0864; H04L 43/087; H04L 43/50
See application file for complete search history.

(56) References Cited

U.S. PATENT DOCUMENTS

| | | | | |
|---|---|---|---|---|
| 2003/0185223 A1* | 10/2003 | Tate | ........ | H04L 12/4604 370/410 |
| 2006/0045021 A1* | 3/2006 | Deragon | ........ | H04L 1/243 370/249 |
| 2008/0117827 A1* | 5/2008 | Matsumoto | ........ | H04L 43/0811 370/244 |
| 2011/0069620 A1* | 3/2011 | Gintis | ........ | H04L 43/50 370/250 |
| 2014/0016479 A1* | 1/2014 | Coomber | ........ | H04L 43/50 370/252 |
| 2014/0258504 A1* | 9/2014 | Kahkoska | ........ | H04L 43/12 709/224 |
| 2016/0216913 A1* | 7/2016 | Bosshart | ........ | H04L 45/74 |
| 2020/0021510 A1* | 1/2020 | Gintis | ........ | H04L 43/50 |
| 2024/0250847 A1* | 7/2024 | Barry | ........ | H04L 12/4641 |

* cited by examiner

*Primary Examiner* — Stephen J Clawson
(74) *Attorney, Agent, or Firm* — Mannava & Kang, P.C.

(57) ABSTRACT

A network test device tests key performance indicators for a link aggregation group (LAG). Ports for the LAG are determined. Test streams including test frames are generated and transmitted from the ports to test the LAG. The test frames include a unique stream identifier for a corresponding test stream. The test frames may be looped back. Key performance indicators for the LAG are determined based on the received test frames and the unique stream identifier in each test frame.

20 Claims, 22 Drawing Sheets

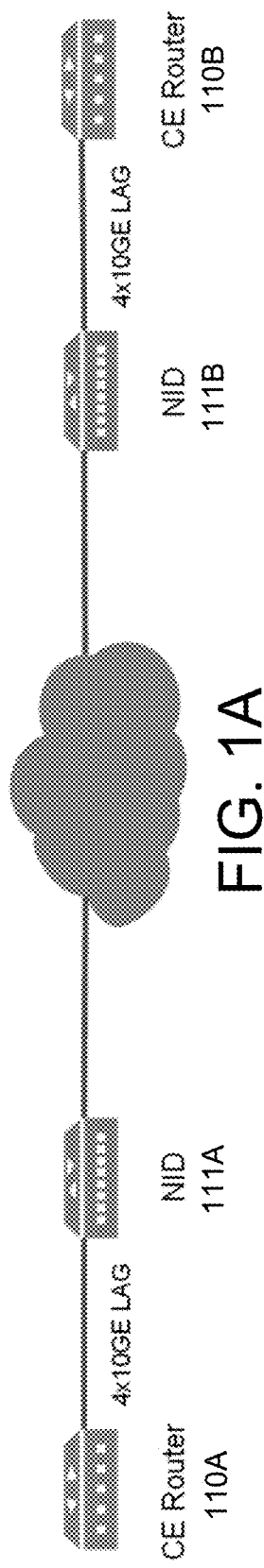

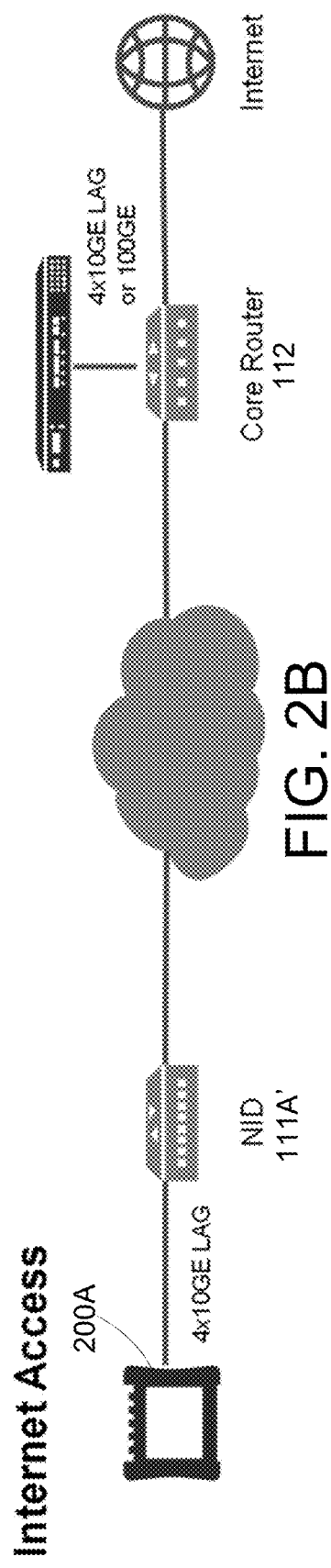

FIG. 9B

SYSTEM | TEST | * FIBER OPTICS | | | | | V🔊 ⓘ | 📞 | — □ ×
SAMCOMPLETE | | | | | | | | | 4:47 PM
SLA | 1|2 | SLA THROUGHOUT | | | | | | | 04/14/2021
NOT RUNNING | | | | | | PORT 1: 4X10GigE LAYER 2 LAN TERM
| | | | | | GO TO...

⊘ SLA THROUGHPUT, L1 Mbps
⊘ POLICING  ⊘ MAX LOAD

| # | SERVICE | CIR | EIR | | |
|---|---------|---------|-----|---|---|
|   | ALL     | 10000.0 | 0.0 | ☐ |   |
| 1 | PORT 1  | 10000.0 | 0.0 | ☐ | 10000.0 |
| 2 | PORT 2  | 10000.0 | 0.0 | ☐ | 10000.0 |
| 3 | PORT 3  | 10000.0 | 0.0 | ☐ | 10000.0 |
| 4 | PORT 4  | 10000.0 | 0.0 | ☐ | 10000.0 |

SET ADVANCED TRAFFIC SETTINGS

⇦ NETWORK: TAGGING          NEXT ⇨  SLA: SLA PERFORMANCE

⬅ EXIT

*FIG. 9C*

| # | SERVICE | FRAME LOSS RATIO | ☑ FRAME DELAY (RTD, ms) | ☑ DELAY VARIATION (ms) |
|---|---------|------------------|-------------------------|------------------------|
| 1 | PORT 1 | 0.000000000 | 20.000 | 0.001 |
| 2 | PORT 2 | 0.000000000 | 20.000 | 0.001 |
| 3 | PORT 3 | 0.000000000 | 20.000 | 0.001 |
| 4 | PORT 4 | 0.000000000 | 20.000 | 0.001 |

SLA: SLA THROUGHPUT    SET ADVANCED SLA SETTINGS

SYSTEMS AND METHODS FOR LINK AGGREGATION GROUP TESTING

PRIORITY

The present application claims priority to U.S. provisional patent application Ser. No. 63/178,883, filed on Apr. 23, 2021, which is incorporated by reference in its entirety.

TECHNICAL FIELD

This patent application is directed to link aggregation group testing in a telecommunication network.

BACKGROUND

Global growth in communications and data services is driving increasing demand for Ethernet. As businesses and consumers demand more and more data, the pressure is on service providers to supply reliable Ethernet with the capacity for growth and to do it quickly. Customers want easy, well-priced access to reliable high-speed, cloud-based data services such as streaming, Internet of Things, and next-generation networks. To capitalize on demand and manage operational costs, service providers will rely on testing tools that help them turn up and monitor Ethernet connections quickly, safely, and cost-effectively with minimal complications.

BRIEF DESCRIPTION OF DRAWINGS

Features of the present disclosure are illustrated by way of example and not limited in the following Figure(s), in which like numerals indicate like elements, in which:

FIGS. 1A-B show link aggregation group (LAG) customer handoff applications, according to examples of the present disclosure;

FIGS. 2A-B show LAG test applications, according to examples of the present disclosure;

FIGS. 7A-C, 8A-D and 9A-F show user interfaces, according to examples of the present disclosure.

DETAILED DESCRIPTION

Figure 3:
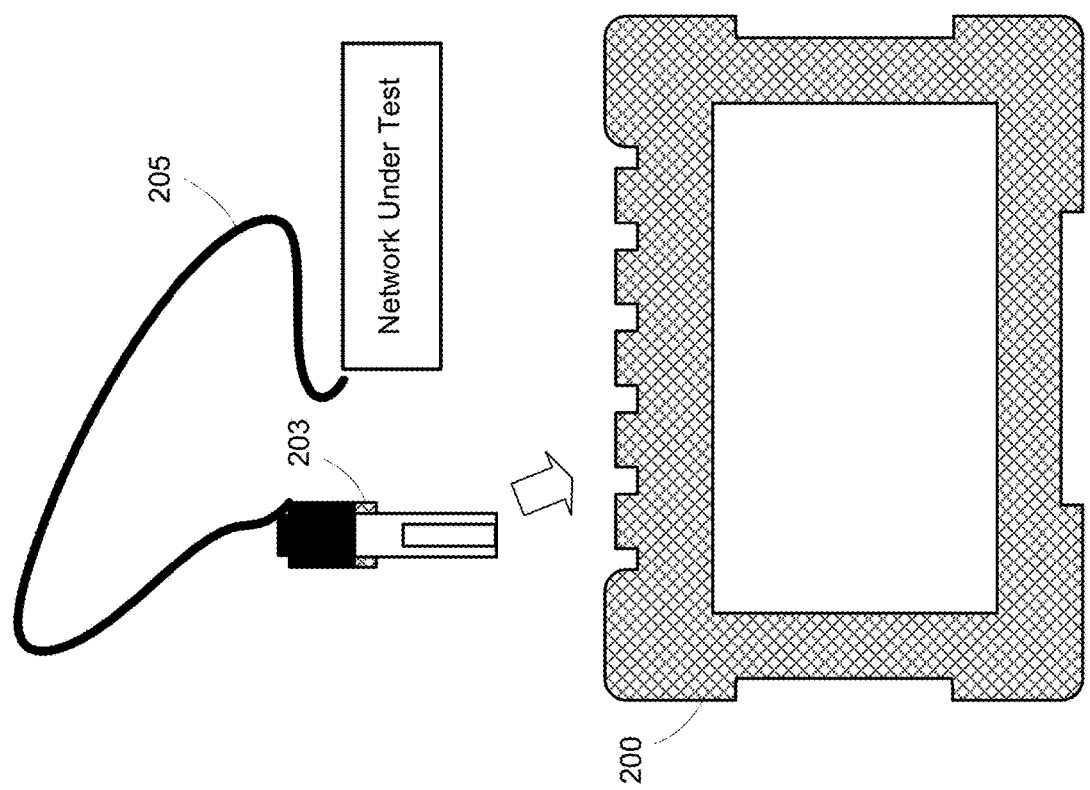
FIGS. 3-4 shows a test device, according to examples of the present disclosure.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an example of the present disclosure, a test device, systems and methods are provided for field testing multiple physical interfaces, such as Gigabit Ethernet (GE) optical interfaces combined into a link aggregation group (LAG). The testing adapts Y.1564 test methodology to create a single test across multiple physical interfaces. In particular, for the testing, packets that return on any port are internally aggregated to form a single test that spans multiple physical ports. Conventional field test equipment cannot support testing of N×10 GE physical interfaces combined together in a LAG, as is further discussed below, where N is an integer greater than 1. The testing according to examples of the present disclosure is not limited to a LAG comprised of N×10 GE physical interfaces. The testing may be applied to LAGs comprised of interfaces operating at greater than or less than 10 GE. 10 GE is simply used as an example.

FIGS. 1A-B show examples of using LAG customer handoff applications in computer networking. Link aggregation refers to various methods of combining (aggregating) multiple network connections in parallel in order to increase throughput beyond what a single connection could sustain, and to provide redundancy in case one of the links should fail. A LAG is the collection of physical ports combined together.

Service providers connect customer sites through Ethernet services that terminate on a demarcation device. For example, frequently a customer edge (CE) router at the customer premises creates a Layer 2/Layer 3 virtual private network (VPN) for multi-site connectivity. This is shown in FIG. 1A. For example, CE routers 110A-B are provided at different customer premises.

Also, a CE router 110 can provide Internet access for a customer. For example, FIG. 1B shows CE router 110A' providing Internet access for a customer. The CE router is designed to ensure that a network's edge can deliver quality services while also providing a high level of network security, and are often used for campuses, data centers and branch networks. The CE router is typically customer premises equipment.

The CE router sits at the point where a local area network (LAN) or a wide area network (WAN) of a customer connects to external networks at a demarcation point. The demarcation point is often a network interface device (NID) of the service provider that connects the customer network to external networks and provides Ethernet service demarcation. The NID is typically service provider equipment. In FIG. 1A, NIDs 111A-B connect the customer network to external networks, and in FIG. 1B, NID 111A' connects the customer network to external networks such as the Internet. Core router 112 is also shown in FIG. 1B, which is designed to operate in the Internet backbone.

CE routers are often capable of being operated in LAG mode to aggregate network connections to increase throughput, and service providers are offering customers Internet access and Ethernet private line services with an N×10 GE handoff using LAG. For example, multiple 10 GE ports on the CE router are configured to operate in LAG mode to create a 40 GE connection to an external network, such as shown in FIGS. 1A-B. The NID devices convert from N×10 GE to 40 GE or N×10 GE on the network side. Accordingly, the LAG makes 40 GE throughput available to the customer instead of 10 GE throughput.

Conventionally, this type of hand off, e.g., from N×10 GE to 40 GE and vice versa, is not testable because state of the art test equipment only provides testing on a single physical interface. For example, Y.1564 is standard published by the ITU Telecommunication Standardization Sector (ITU-T), which is an Ethernet service activation test methodology commonly used for turning up, installing and troubleshooting Ethernet-based services. Y.1564 Service Activation Testing (SAT) is a Carrier Ethernet testing standard that tests all data flows and service attributes, including multi-flow Information Rate and Traffic Policing. It is a standardized test methodology that allows for complete validation of Ethernet service-level agreements (SLAs) in a single test. The Y.1564 defines test streams with service attributes to test SLA compliance. The Y.1564 focuses on multiple key performance indicators (KPIs), including bandwidth (e.g., bit rate) and frame loss ratio, which is typically expressed as a ratio of number of packets lost over the total number of packets sent. Typically, the KPIs are measured for a test stream transmitted from a single port. However, for a LAG, the test streams transmitted on each port are aggregated in the network and will return on a different port due to the hash-based load distribution employed in the LAG network. As a result, frame loss and other KPIs cannot be determined because the frames of each stream have been distributed across all the physical interfaces in the LAG.

According to an example of the present disclosure, a test device 200 is operable to measure KPIs for a LAG. The KPIs may include frame loss, throughput, latency, latency variation and other KPIs. The KPIs for the LAG may be used to determine whether SLA parameters are being met. In an example, ports on the test device 200 are configured for the LAG. Test streams including test frames are transmitted on the ports into a network under test. A stream identifier is embedded in each test frame, such as in the payload, prior to transmitting the test streams. The stream identifier is unique to the test stream. The test streams are received, in the same test device for loopback or another test device, via the network under test. The test frames are scrambled across the ports due to the link aggregation. For example, the test frames are hash-based load balanced across the ports so test frames transmitted for a test stream from a port may be distributed across multiple ports on the receiving end. The test device 200 determines the test frames for each test stream based on the embedded unique stream identifier, and then determines the KPIs for the LAG accordingly.

FIGS. 2A-B show the test device 200 connected to a NID for the example use cases of FIGS. 1A-B. For example, in FIG. 2A, test devices 200A-B are connected to NIDs 111A-B at each end of the virtual private line. For example, test device 200A generates and transmits test streams in LAG mode to test device 200B which measures the KPIs for the LAG or loops back the test streams for measuring at the test device 200A. Test device 200A may be referred to as a local test device and the test device 200B is a remote test device in this case. The local test device may send a command to the remote test device to put it in loopback mode so test frames transmitted to the remote test device are looped back to the local test device to measure KPIs of the LAG. Also, the test devices 200A-B can be operated in a non-loopback mode to measure the KPIs in each direction. In FIG. 2B, test device 200A' connects to NID 111A' to measure the KPIs for the LAG connection to the Internet. Core router 112 shown in FIG. 2B can operate in a LAG mode.

FIG. 3 shows the test device 200 which may be used in FIGS. 2A-B or other use cases to measure KPIs for a LAG and perform other measurements. The test device 200 can measure KPIs for a LAG in a network under test, to verify performance under severe or other conditions. The test device 200 can perform Y.1564 testing to measure KPIs for each physical interface, i.e., each port. Also, according to an example of the present disclosure, the test device 200 can measure KPIs for the LAG, as was discussed above. The test device 200, for example, is a portable device with a display that can connect to the network under test to perform any number of tests and measurements. The test device 200 may be able to perform network tests by generating, transmitting, and/or receiving high-speed signals.

The test device 200 includes ports to connect to the network under test to perform the testing. The ports can be combined in a LAG when operating in LAG mode to test the LAG. In an example, the test device 200 can connect to an optical pluggable transceiver 203 to provide additional ports for the test device 200. For example, the test device 200 includes two built-in ports, however, a technician desires to test a LAG comprised of four ports to simulate a CE that has four ports for a LAG. The optical pluggable transceiver 203 includes four ports, and the optical pluggable transceiver 203 may be connected to one of the ports of the test device 200 to provide additional ports for the test device 200. These ports of the optical pluggable transceiver 203 (e.g., referred to as subports) may be combined in a LAG for testing. In an example, the optical pluggable transceiver 203 may be a Quad Small Form Factor Pluggable (QSFP) transceiver commonly used in data centers that may comprise, for example, but not limited to, 10 G, 25 G, 40 G, 100 G, 200 G, and/or 400 G optical transceiver, and beyond. However, other types of optical pluggable transceivers may be used.

FIG. 3 also shows an optical cable 205. The optical cable 205 may connect one or more ports of the test device 200 to the network under test. In an example, the optical cable 205 may be comprised of multiple fiber optic cables, such as multiple 10 GE fiber optic cables, each connectable to a port of the NID and ports of the optical pluggable transceiver 103 or built-in ports of the test device 200.

Figure 4:
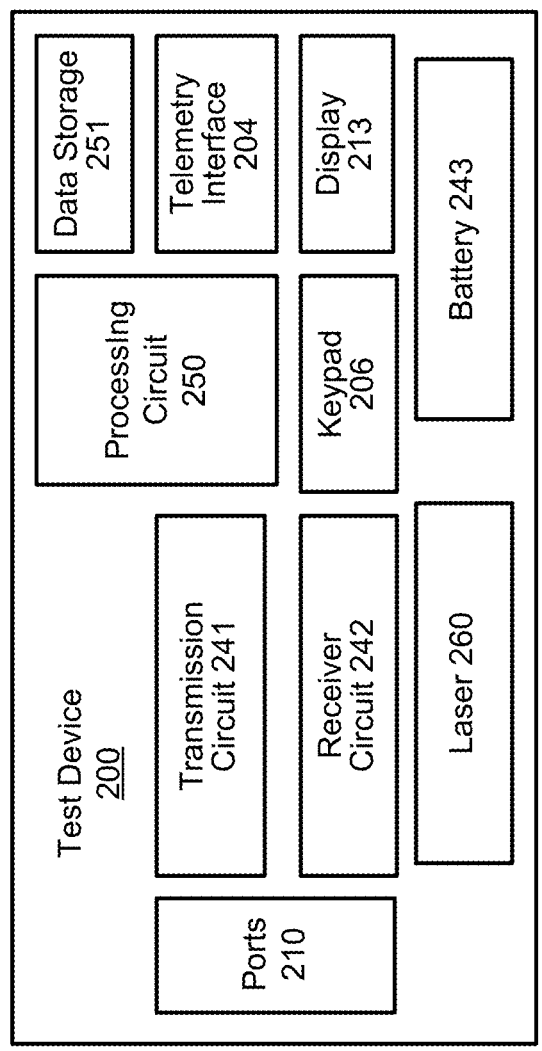

FIG. 4 illustrates a block diagram of the test device 200, according to an example. The test device 200 may include a variety of components. The test device 200 may be connected to a network (e.g., an optical network) at any desired test point (TP) to measure signals transmitted in the network. The test device 200 may include ports 210. In some examples, the ports 210 may be used to connect to the test point (TP), such as to connect to a NID such as shown in FIGS. 2A-B. It should be appreciated that these ports 210 may include physical interfaces to connect to an optical network. Multiple ones of the ports may be operated in LAG mode to measurer KPIs of the LAG. The test device 200 may include a laser 260, which may be an LED or other type of laser, to transmit optical signals including network traffic via one or more of the ports 210.

The test device 200 may also include a telemetry interface 204 for connecting to a telemetry channel, such as a WiFi interface, Bluetooth interface, cellular interface or another network interface. The telemetry interface 204 may function as an additional communication channel. For example, the test device 200 may connect to any number of remote devices via the telemetry interface 204.

It should be appreciated that the test device 200 may include a keypad 206 and display 213. The display 213 may include a touch screen display. A user may interact with the test device 200 via the user interface to enter information, select operations, view measurements, examine signal profiles, communicate with other devices, etc.

A data storage 251 may also be found in the test device 200. The data storage 251 may store any information used by the test device 200 and may include memory or another type of known data storage device. The data storage 251 may store data, KPIs, power level measurements, test results, and/or any other measurements or data used by the test device 200. The data storage 251 may include a non-transitory computer readable medium storing machine-readable instructions executable by processing circuit 250 to perform operations of the test device 200.

A transmission circuit 241 may include a circuit for sending test signals into the network under test to perform various tests. The test signals may include optical signals. The transmission circuit 241 may include encoders, modulators, and other known component for transmitting signals in the network under test. A receiver circuit 242 may include components for receiving signals from the network under test. The receiver circuit may include a photodiode and other known components of an optical receiver. The transmission circuit 241 and/or the receiver circuit 242 may also include other components, such as a demodulator, a decoder, an analog-to-digital converter (ADC), and/or other circuit components or elements.

A processing circuit 250 in the test device 200 may include any suitable hardware to perform the operations of the test device 200 described herein. The hardware of the test device 200, including the processing circuit 250, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test device described herein may be performed by the processing circuit or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. It should be appreciated that the test device 200 may also include components other than what is shown.

The test device 200 may be a portable, hand-held device that includes a battery 243. The test device 200 may be used by technicians in the field for measuring and troubleshooting.

Figure 5:
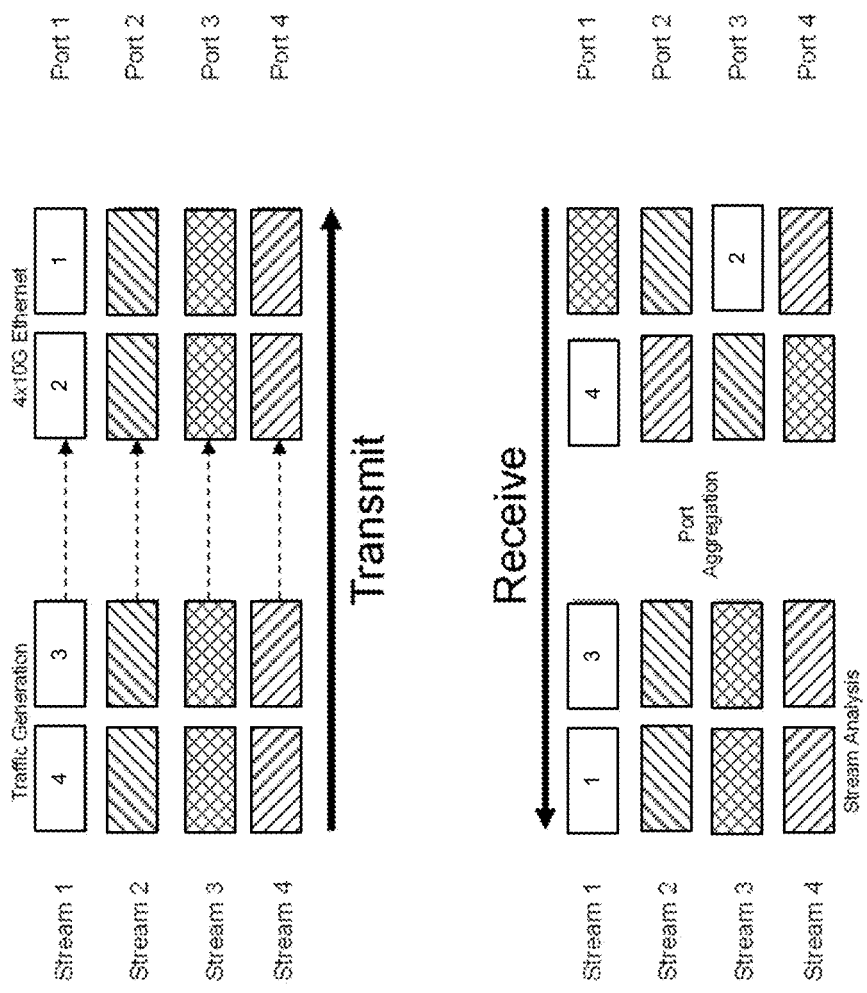
FIG. 5 shows test stream generation and mapping, according to an example of the present disclosure.

FIG. 5 shows an example of measuring KPIs for a LAG. In particular, FIG. 5 shows an example whereby the test device 200 generates four test streams, shown as streams 1-4, and transmits streams 1-4 in LAG mode on ports 1-4 of the test device 200. Accordingly, the LAG is comprised of ports 1-4. The aggregated streams become scrambled as shown in the received streams, i.e., the received test streams are scrambled across ports 1-4. For example, hash-based load balancing is performed to balance the load across the links which cause test frames to be received out of sequence. For example, a test frame for stream 1 transmitted from port 1 is received on a different port of the LAG. For example, for a LAG, the test streams transmitted on each port are aggregated in the network and include frames that return on a different port due to the hash-based load distribution employed in the LAG network. This is shown in FIG. 5. For example, test stream 1 is transmitted from port 1 but frames for the test stream may be received on ports in the LAG other than port 1. For example, for the received streams, stream 1 includes a frame of stream 3; stream 2 includes a frame from stream 4; and so on. Because the streams are scrambled, a conventional single port test Y.1564 test would incorrectly assume frames are being dropped or out of sequence, and would generate incorrect frame loss results and potentially incorrect bandwidth results. For example, a conventional single port test Y.1564 test would incorrectly assume frame 2 of stream 1 was dropped even though frame 2 of stream 1 was received on port 3.

According to an example of the present disclosure, the test device 200 includes a stream signature, such as the stream identifier unique to the test stream, in each packet of the test stream. Accordingly, packets in transmitted stream 1 include a stream identifier for stream 1; packets in transmitted stream 2 include a stream identifier for stream 2; and so on. The processing circuit 250 of the test device 200 can then correctly measure KPIs of the received streams in the LAG using the stream identifiers in the received packets of the received streams. For example, the processing circuit 250 receives the streams on each port, and determines the test stream for each frame of the test stream. Based on the received frames and the determined test stream for each frame, the processing circuit determines a number; i.e., an amount, of lost frames for each test stream. Thus, out of sequence errors are suppressed and accurate counts of lost packets/lost frames can be determined by the test device 200. Further, Y.1564 KPIs which are discussed below are determined and other KPIs discussed herein may be determined.

Figure 6:
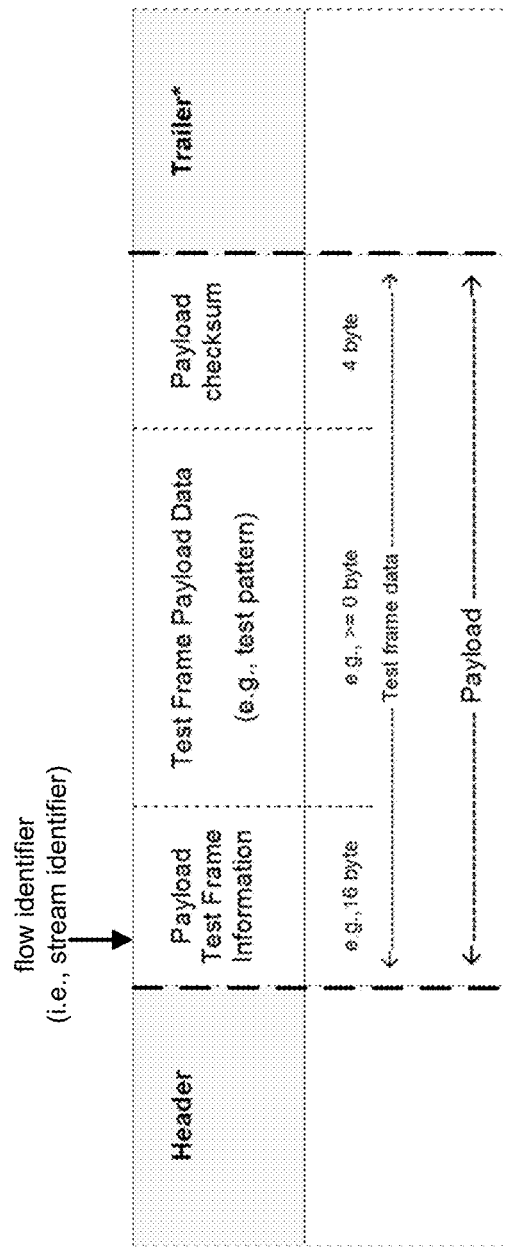
FIG. 6 shows a test frame format, according to an example of the present disclosure.

FIG. 6 shows an example of a test frame format for test frames that are transmitted in test streams, such as test streams 1-4, for testing a network under test, according to an example of the present disclosure. The test streams are also referred to as test flows. The test streams are comprised of test frames which serve as the foundation of packet-based measurements, and the test frames may be transmitted in layer 2, layer 3 or layer 4 packets. Among these measurements are quality of service, service disruption and benchmarking (e.g., RFC 2544 or Y.1564 test measurements).

Test frames are used in single-flow and multi-flow environments as well as in looped and point-to-point topologies. Data containing the information necessary for the various measurements is carried inside a test frame. Examples of the relevant data carried in a test frame include sequence number, transmit timestamp, payload checksum, flow identifier, and control information. The flow identifier is the stream identifier discussed above, which is used by the test device 200 to identify which received frames belong to which test streams in order to determine the Y.1564 KPI test measurements for the LAG. The flow identifier for example is provided in the payload test frame information of the payload.

As shown in FIG. 6, the test frame format comprises a header, payload and a trailer. The payload information includes payload test frame information including the sequence number, the transmit timestamp, the payload checksum, the flow identifier, and the control information. The payload may include additional data, such as a bit pattern, e.g., pseudorandom binary sequence (PRBS) pattern, to be analyzed for bit error measurements. When the test device 200 receives the aggregated streams, such as the received streams shown in FIG. 5, the test device 200 decodes the payload test frame information to determine the stream identifiers for each received test frame. The test device 200 maps each test frame to a test stream, which enables the test device 200 to determine Y.1564 KPIs for the LAG, such as frame loss ratio, bandwidth, latency, latency variation, etc.

RFC 2544 is a standard published by the Internet Engineering Task Force, and describes a benchmarking methodology for network interconnect devices. RFC 2544 can be used to test Layer 2 (Ethernet) connectivity or Layer 3 (IP) connectivity. Some examples of KPIs for RFC 2544 are now discussed. Throughput is the maximum sustained rate of Ethernet or IP traffic that can be passed through the network without frame loss. Latency is the average time that it takes for Ethernet frames or IP packets to traverse the network; latency can be measured either round trip or separately for each direction, e.g., upstream and downstream. Packet jitter is the average inter-frame delay variation over the course of the test. Frame loss is the ratio of the number of frames lost to the number of frames transmitted over the course of the test. Committed burst size (CBS) is the configured number of bytes of Ethernet frames that can be sent as a burst at line rate without frame loss.

Y.1564 is a more advanced test methodology for measuring Ethernet or IP KPIs when the network supports multiple classes of service (CoS) such as multiple Ethernet VLANs. The test methodology will first verify the configuration of each CoS separately and then verify performance with all CoS running simultaneously. The test verifies both bandwidth profile traffic parameters, e.g., committed information rate (CIR), excess information rate (EIR), and CBS, and SLA performance objectives, e.g., frame delay (FD), frame loss ratio (FLR), and frame delay variation (FDV). CIR verifies that Ethernet frames can be passed through the network at the CIR and still meet SLA performance objectives. EIR verifies that Ethernet frames can be passed through the network at a rate of CIR+EIR and still meet SLA performance objectives. CBS verifies the configured number of bytes of Ethernet frames can be sent as a burst at line rate without frame loss. FD is the average time that it takes for Ethernet frames or IP packets to traverse the network. FD can be measured either round trip or separately for each direction. FLR is the ratio of the number of frames lost to the number of frames transmitted over the course of the test. FDV is the average inter-frame delay variation over the course of the test.

In an example, the Y.1564 KPIs may be determined for each port independently, and may be determined for the LAG. Determining the Y.1564 KPIs for the LAG assumes the LAG is a single port or pipe. For example, to determine the FLR for the LAG, the processing circuit 250 counts the number of lost frames for all the ports in the LAG based on the stream identifiers in the frames, such as described with respect to FIG. 5. This includes determining the total number of lost frames for all four test streams shown in FIG. 5, and determining the total number of frames transmitted in all four test streams.

Figure 7A:
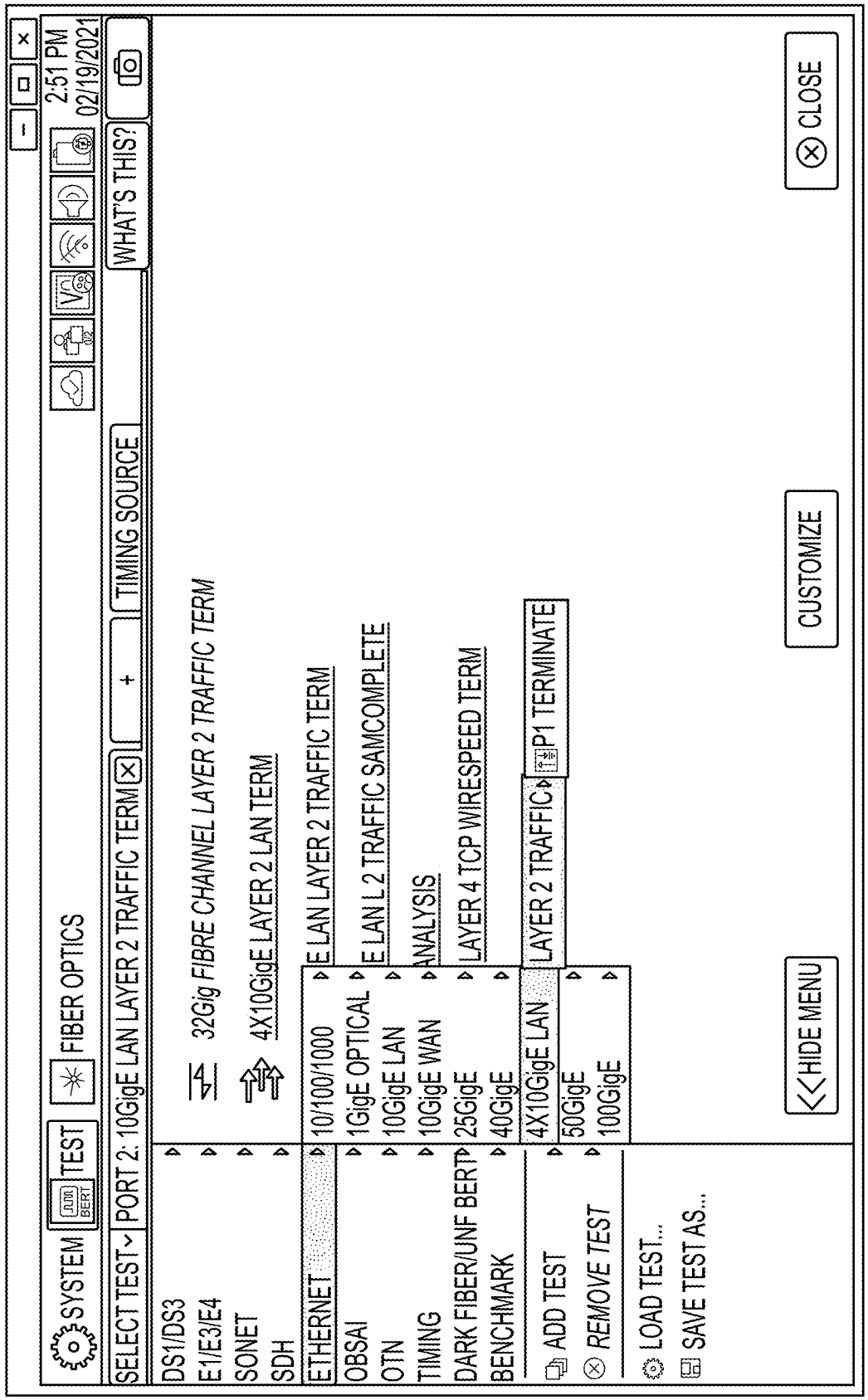
Figure 7B:
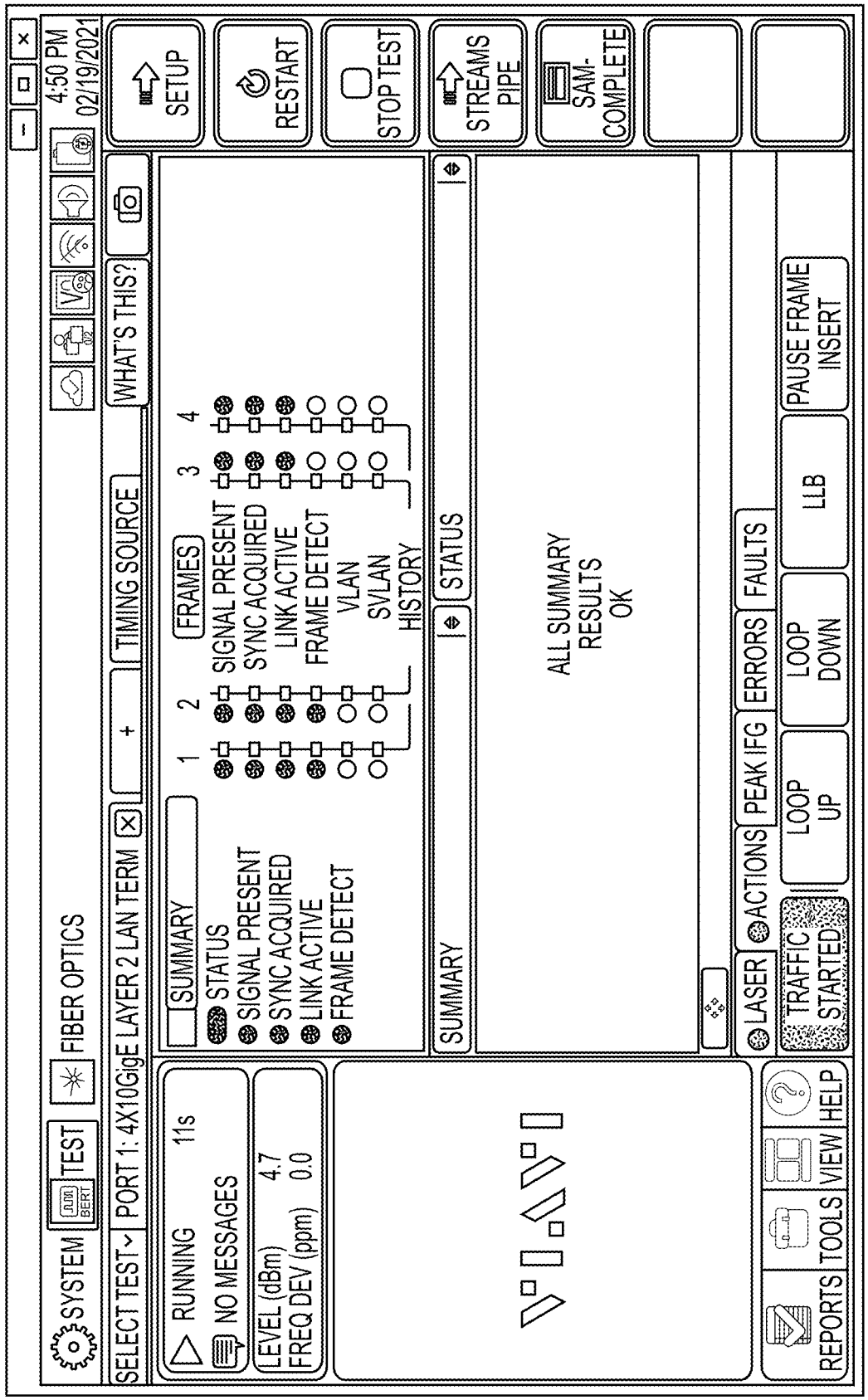
Figure 7C:
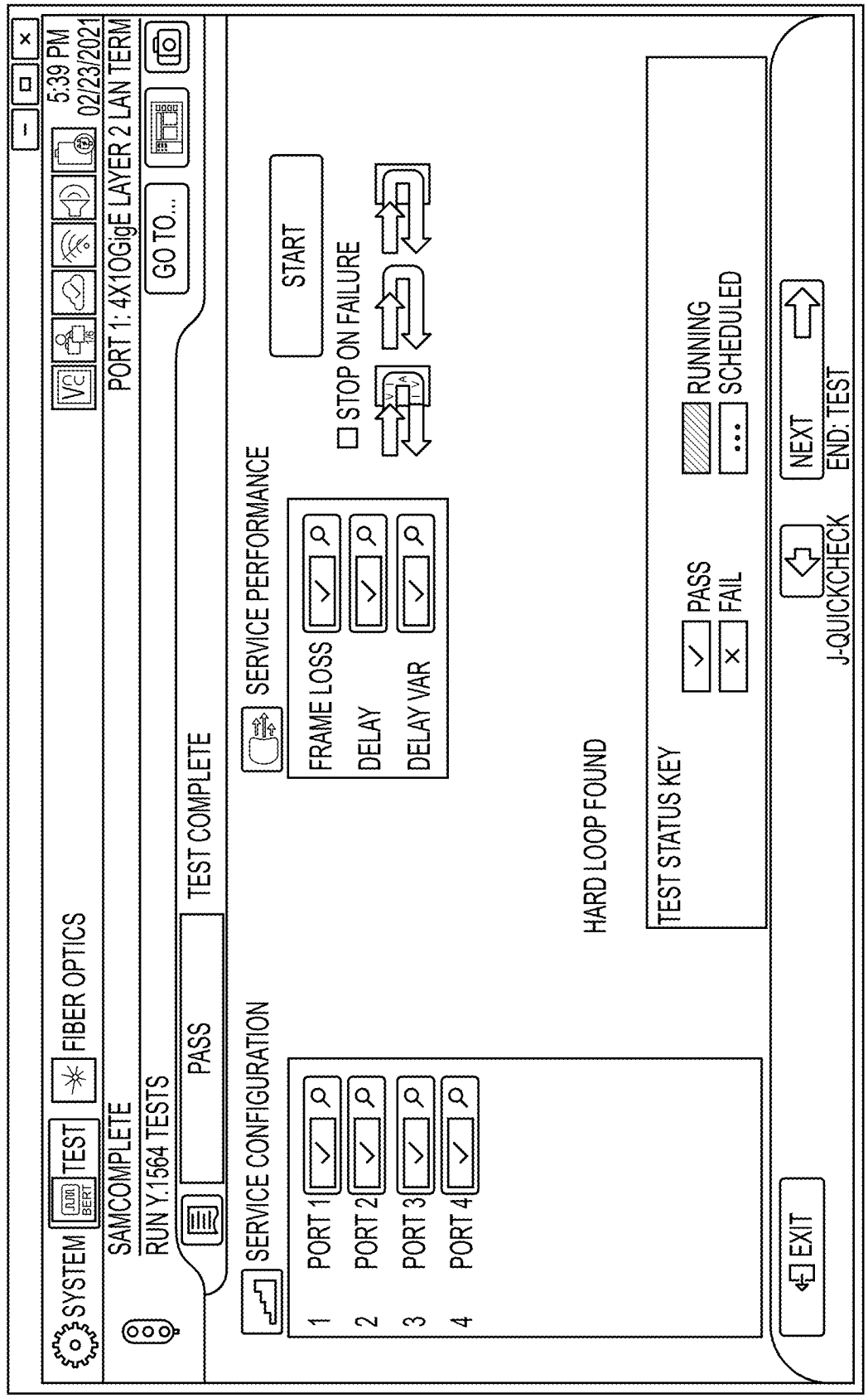

FIGS. 7A-C show examples of user interfaces (UIs) that may be generated and displayed on the display of the test device 200 to perform measurements on a network under test. FIG. 7A shows an example UI where a test is selected for testing a LAG including four 10 GE ports (4×10 GE), each transmitting test streams comprised of test frames. Test frames can be applied at different layers of a protocol stack, and in this case Ethernet MAC Layer 2 is selected. In other examples, IP Layer 3 or TCP/UDP Layer 4 may be selected. Also, port 1 is selected as the terminate point. In this example, the pluggable transceiver 203 shown in FIG. 3 is connected to port 1, and the pluggable transceiver 203 includes the four 10 GE ports for the LAG.

FIG. 7B shows an example of test results that may be displayed in the UI for connectivity. For example, the UI includes LEDs for streams 1-4, and the LEDs may be color coded to indicate status for various metrics such as signal presence, synch acquired, link active and frame detect. As shown, frames are detected for streams 1-2 but not for streams 3-4. So, a technician can quickly determine whether there is a connection problem for streams 3-4.

FIG. 7C shows examples of LAG results. In an example, the LAG is tested and if any issues are detected, such as a KPI of the LAG being outside a threshold, each port of the LAG may be independently tested in a non-LAG mode to identify a cause of the problem and what to do to remediate it. Non-lag mode means each port is configured for an independent link, such as separate Ethernet links that are not aggregated. KPIs for the LAG, such as frame loss, delay, delay variation, etc., are measured and shown. If thresholds are set, the KPIs can be shown as pass or fail. In order to measure the KPIs, out of sequence errors caused by the test frame scrambling shown in FIG. 5 are suppressed based on the test stream identifiers embedded in the test frames. Also, lost frames can be determined for LAG applications even though the test frames are scrambled, such as shown in FIG. 5.

Figure 8A:
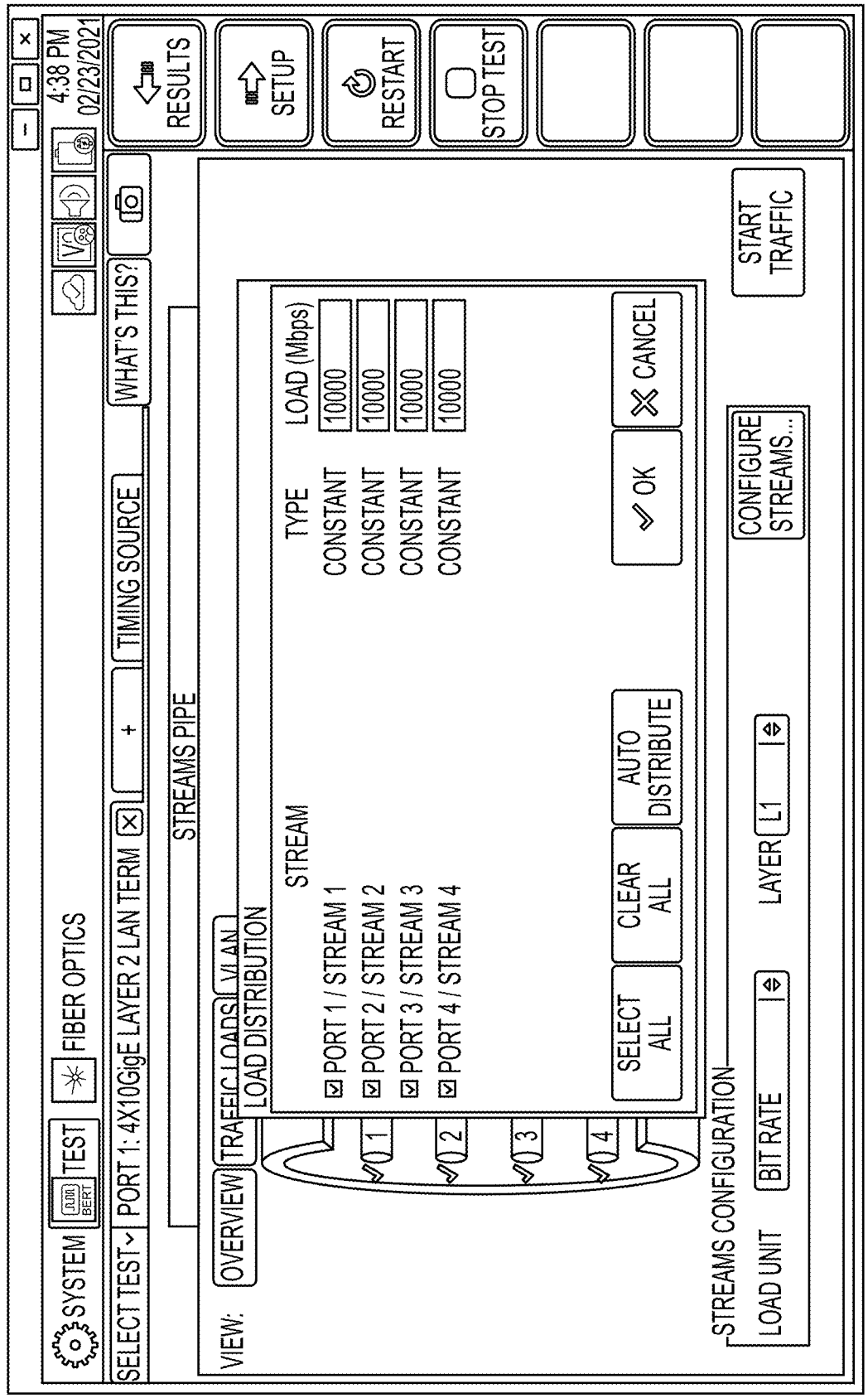
Figure 8B:
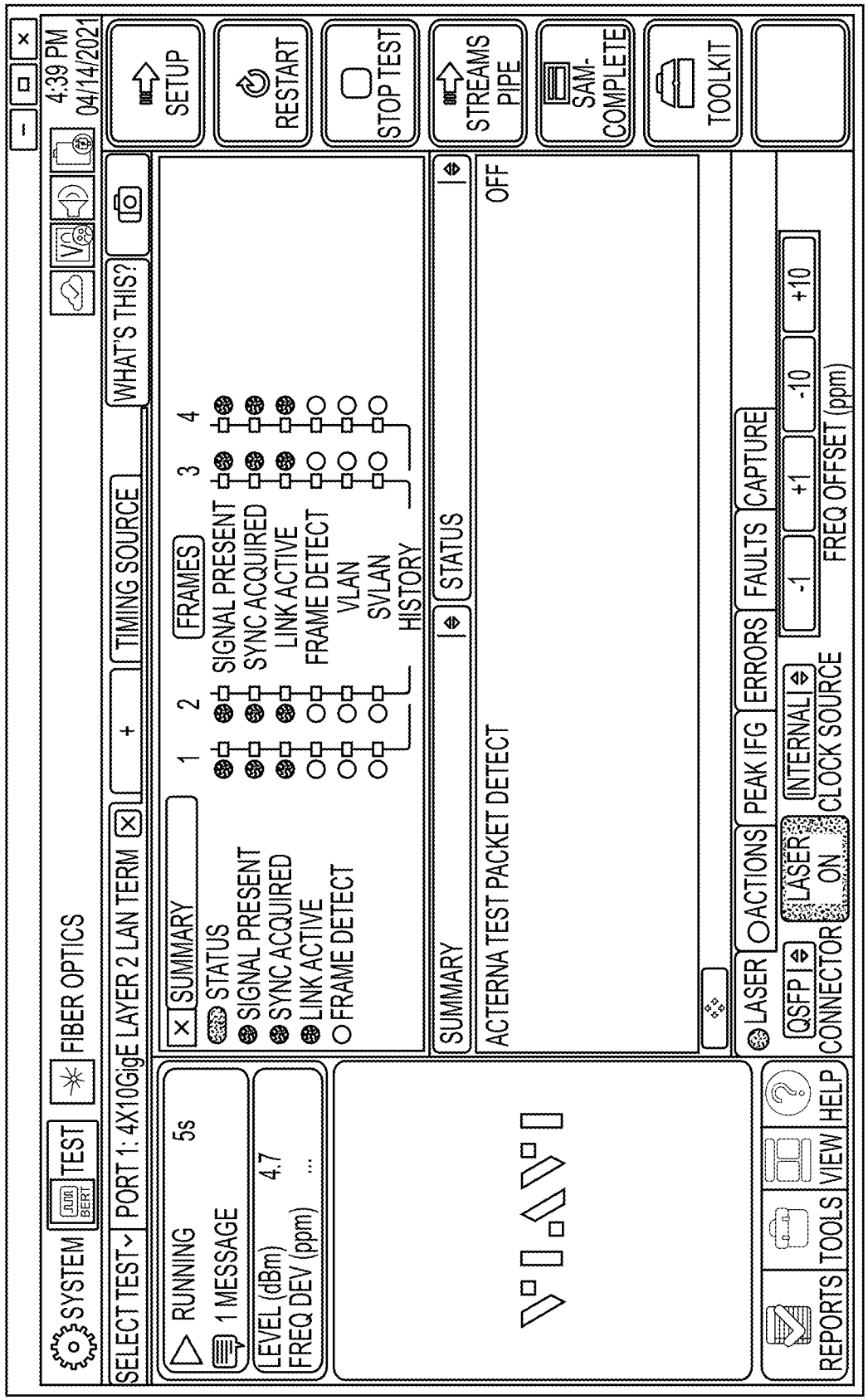
Figure 8C:
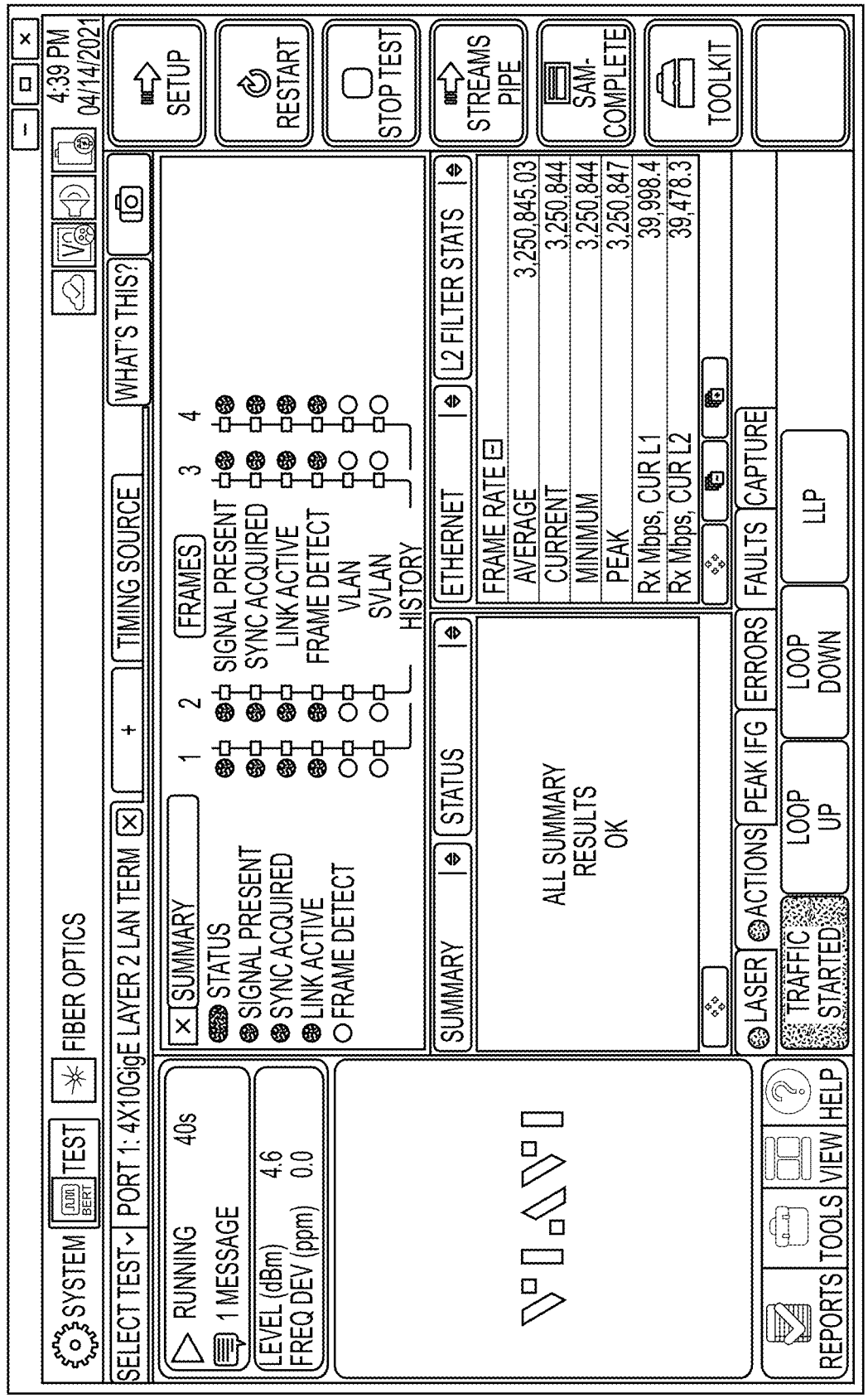
Figure 8D:
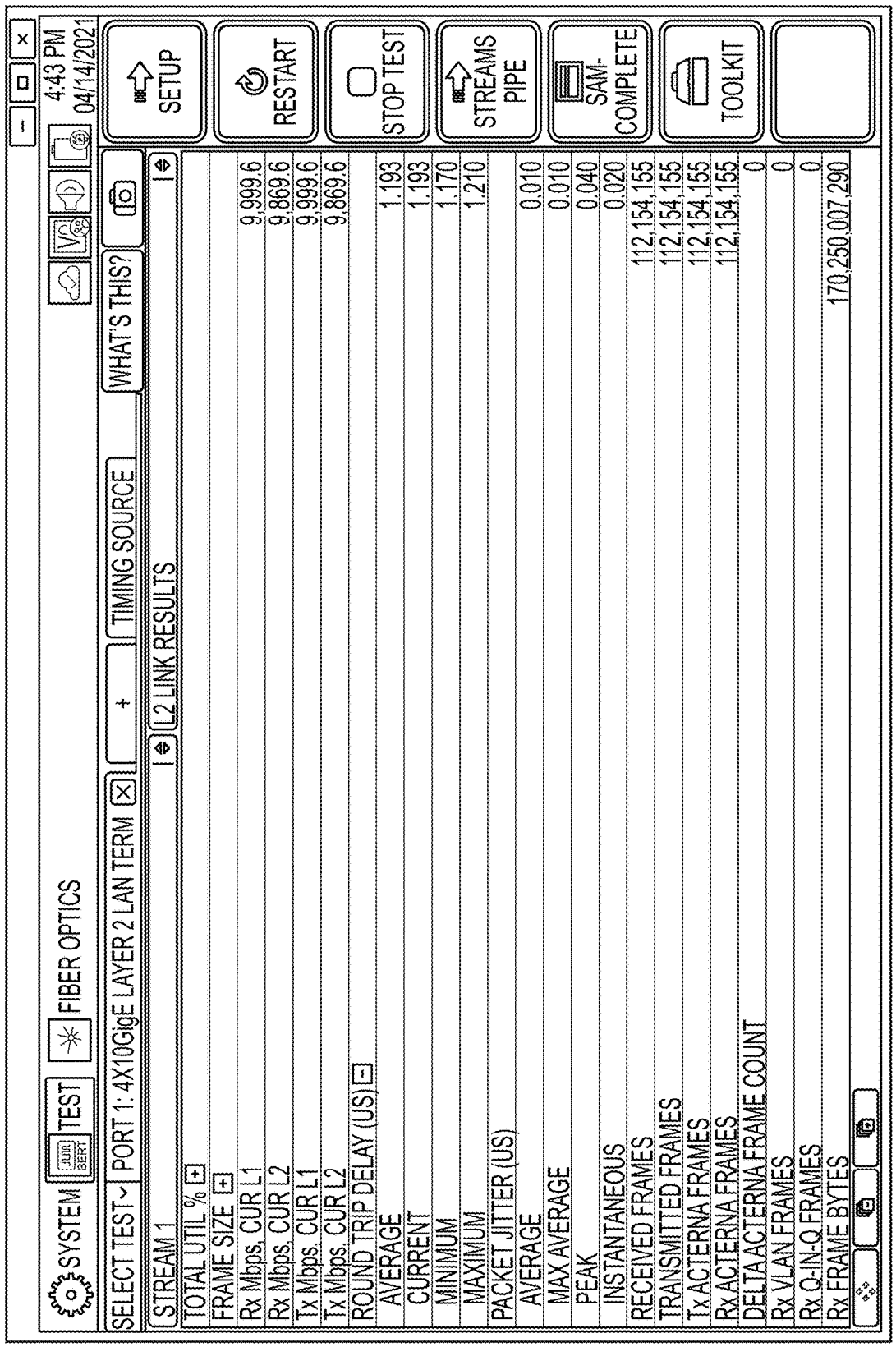

FIGS. 8A-D show additional examples of UIs that may be generated and displayed on the display of the test device 200. FIG. 8A shows selecting ports and a bit rate for each port for testing. FIGS. 8B-C are similar to FIG. 7B, and show testing of connectivity (e.g., see LEDs in FIG. 8B) and throughput (e.g., see frame rate in FIG. 8C). FIG. 8D shows validating KPIs for throughput, frame loss, latency and jitter for one of the four streams.

Figure 9A:
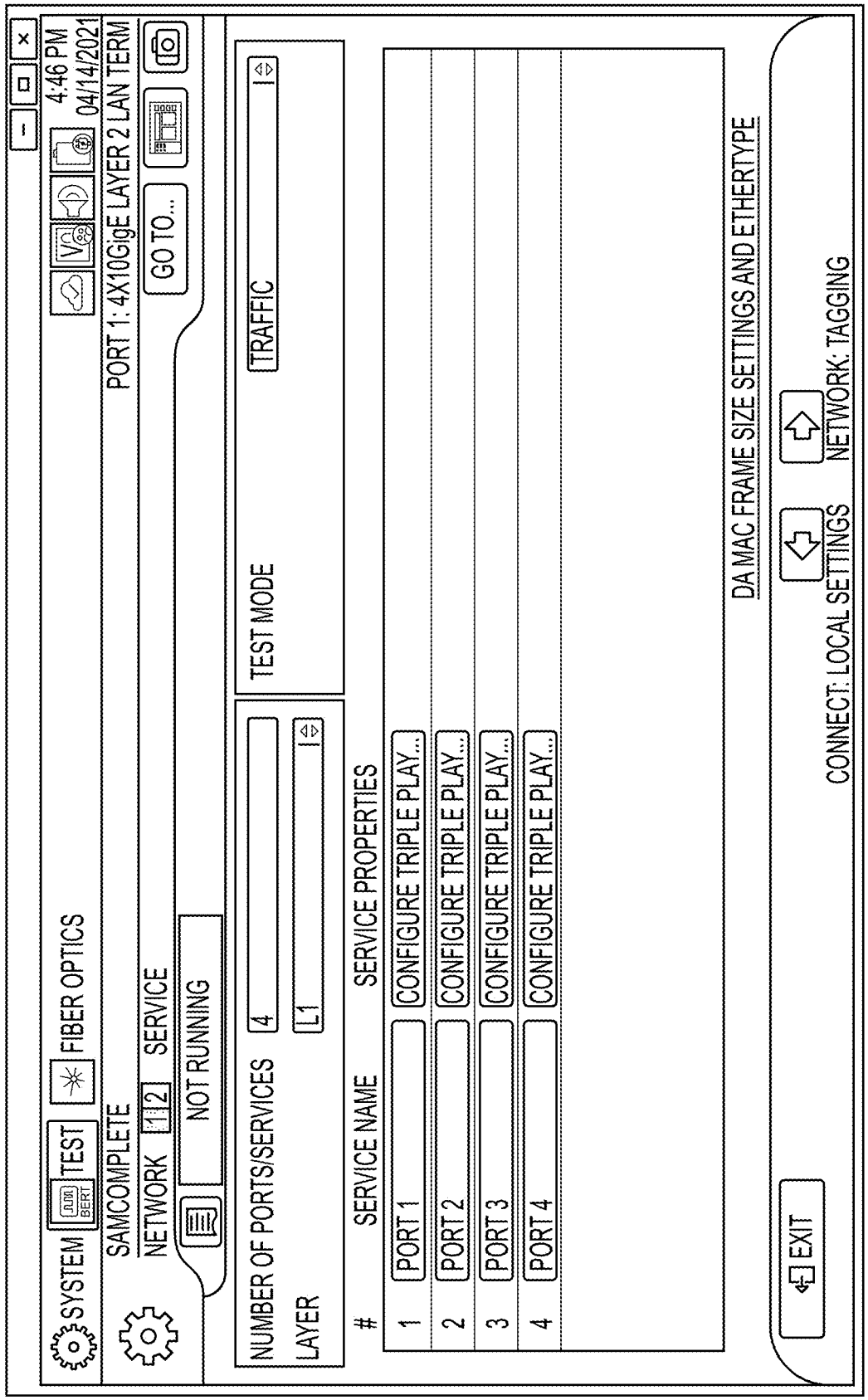
Figure 9D:
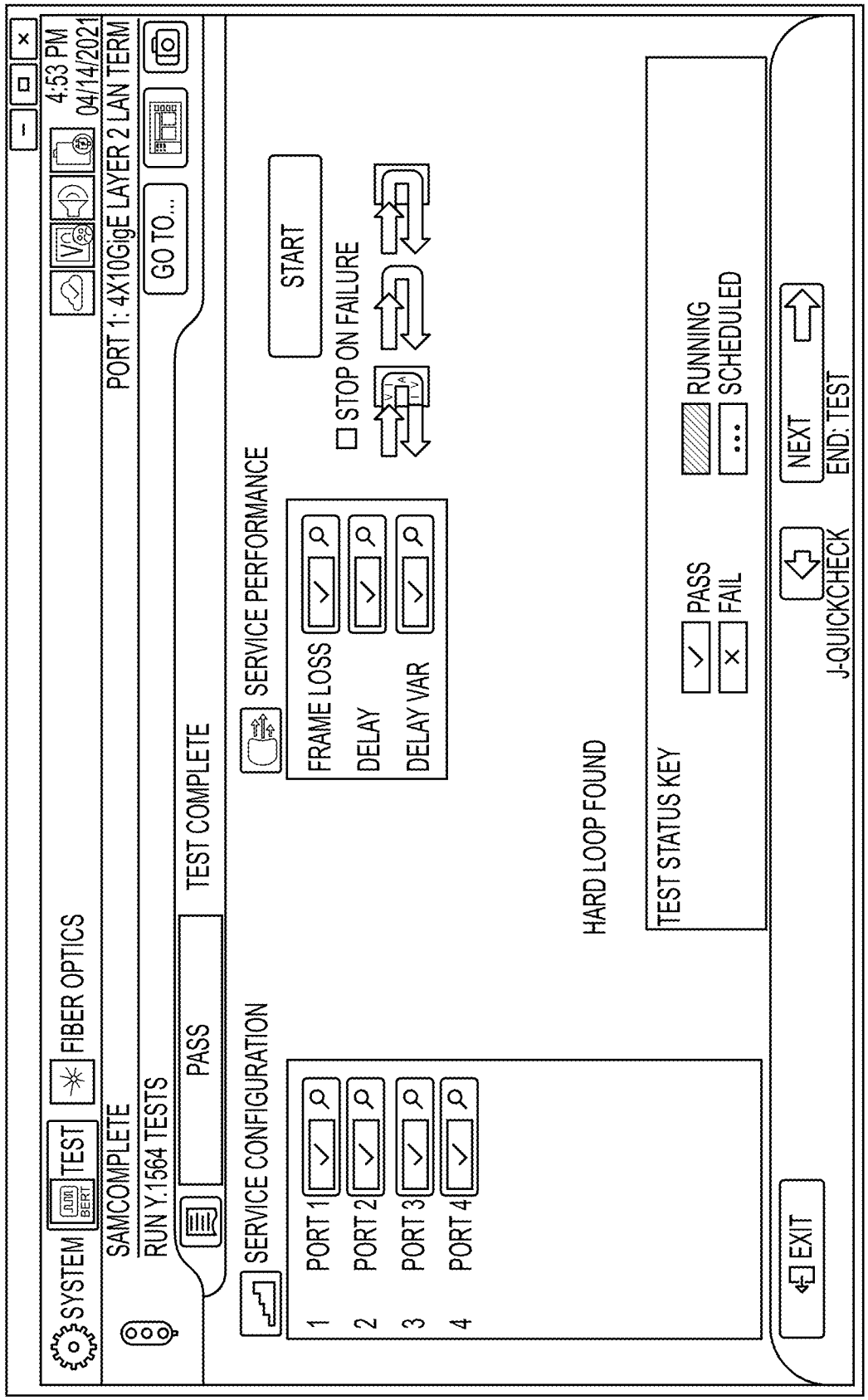
Figure 9E:
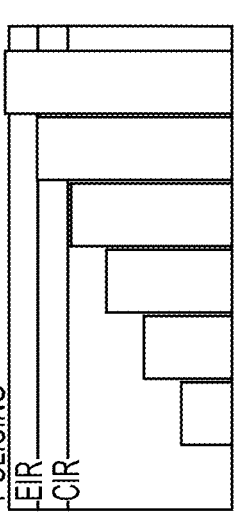
Figure 9F:
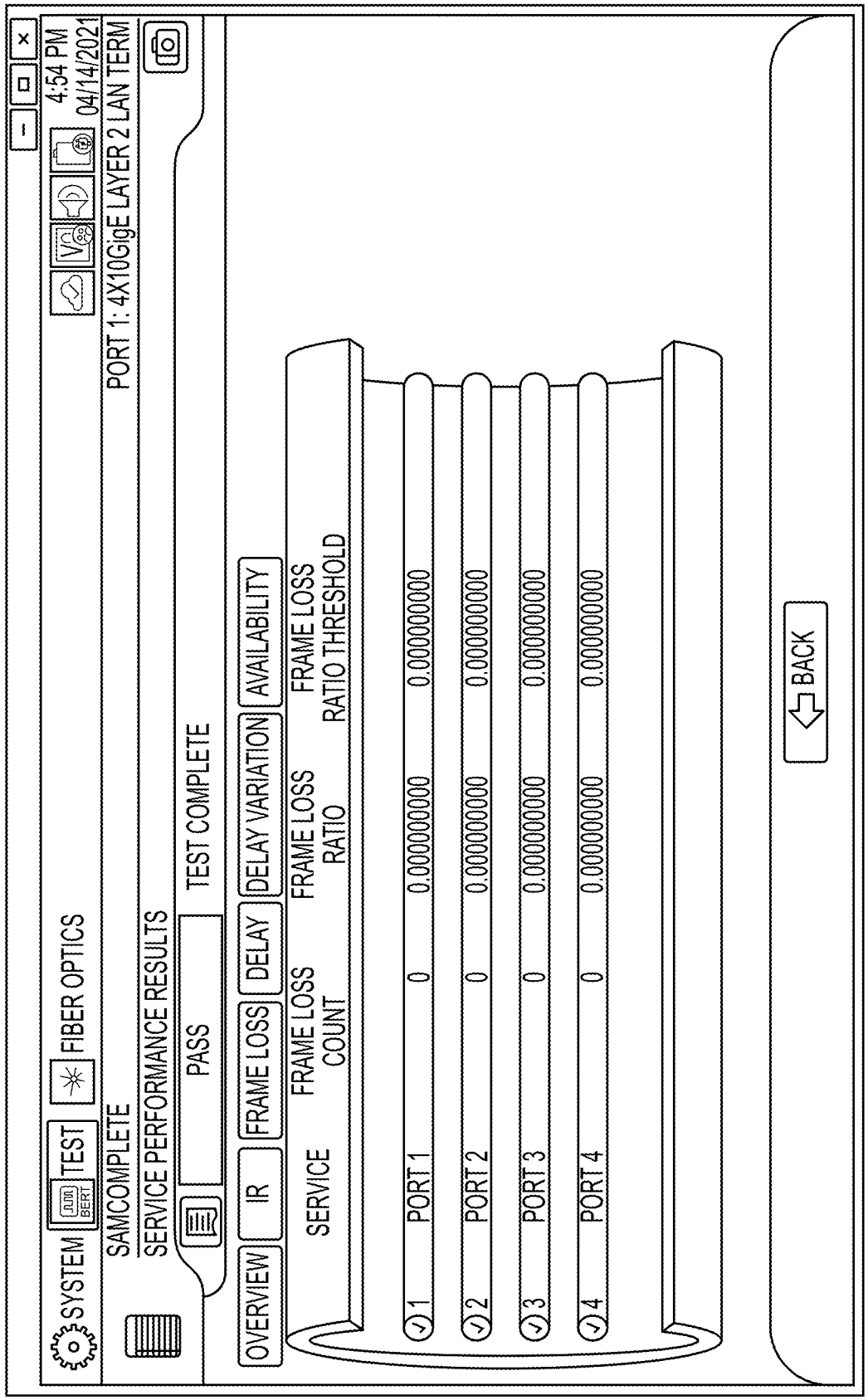

FIGS. 9A-F show examples of UIs that may be generated and displayed on the display of the test device 200 for Y.1564 testing for each port and for a LAG comprised of the four ports. FIG. 9A shows setting the number of ports. FIG. 9B shows setting a CIR for each port. The test streams transmitted on each port may have class of service (CoS) profiles having different frame and bandwidth profiles such as the service's maximum transmission unit (MTU) or frame size, CIR, and EIR. These metrics can be set for each port. FIG. 9C shows setting SLA pass/fail parameters. FIG. 9D shows validating each port in the LAG and then all four ports together. FIG. 9E shows viewing measured KPIs (e.g., throughput, frame loss ratio, frame delay, delay variation and pause detect) for one of four ports. FIG. 9F shows KPIs for the LAG, including throughput, frame loss ratio, frame delay, delay variation and availability, and further shows a drill down on frame loss, such as frame loss count, frame loss ratio and frame loss ratio threshold.

Figure 10:
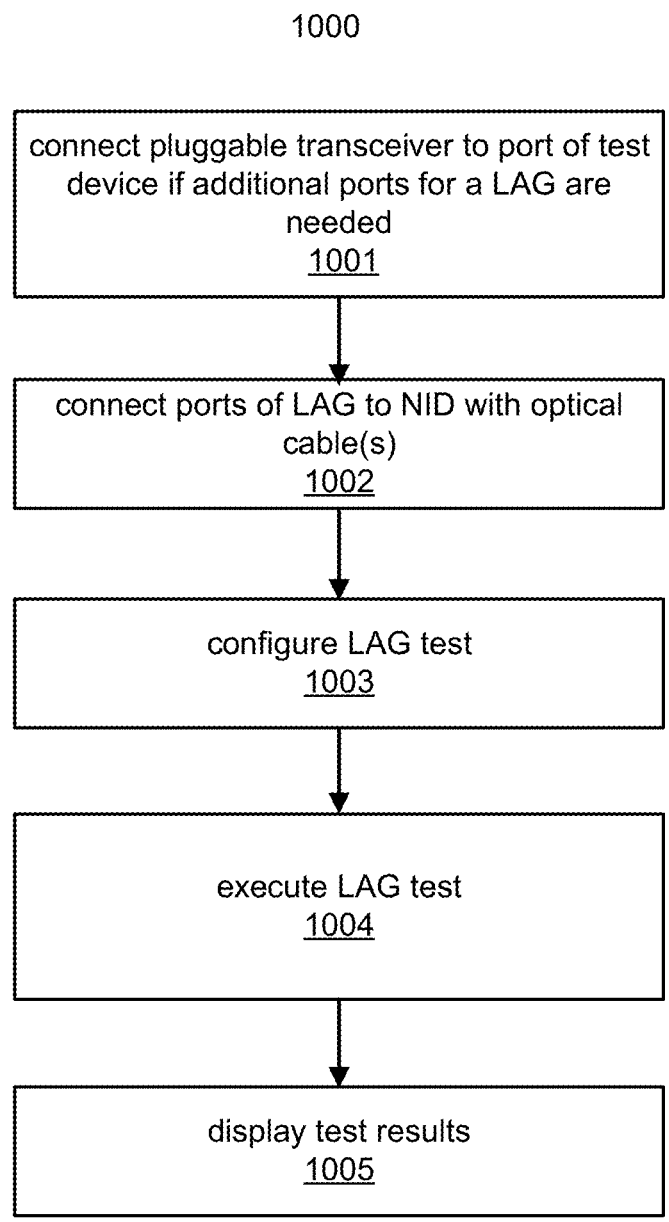
FIGS. 10-11 show testing methods, according to examples of the present disclosure.

FIG. 10 shows a method 1000 for testing a LAG application, according to an example of the present disclosure. The method 1000 and method 1100 discussed below are described by way of example of being performed by the test device 200. At 1001, the pluggable transceiver 203 is connected to a port of the test device 100 if the test device has an insufficient number of ports for testing a LAG having a particular number of ports. For example, if the customer wants to test a 4×10 GE LAG but the test device 100 includes only two ports then the pluggable transceiver 203 having four ports is connected to a port of the test device 200.

At 1002, the optical cable 205 is connected to the ports of the pluggable transceiver 203 and the NID assuming the pluggable transceiver 203 is being used for LAG testing.

At 1003, the LAG test is configured, such as via a UI on the test device 200. For example, to configure ports for the test device for the LAG, the number of ports and identification of ports for the LAG are determined. In an example, the test device 200 generates a UI to allow a user to select the ports for the LAG which may include ports of the pluggable transceiver 203. Also, SLA criteria such as throughput, frame loss as a percentage, maximum latency in milliseconds, delay variation range, etc., are configured.

At 1004, the LAG test is executed, such as via a UI on the test device 200. The LAG test detects connectivity, such as shown via the LEDs in FIG. 7B, and measures the Y.1564 KPIs for the LAG that are discussed above, assuming there is connectivity for all the ports in the LAG. Also, for the LAG test, a remote test device may be put in loop back mode to create a test loop for returning the test streams. Steps for running the LAG test may include transmitting a test stream from each of the ports, wherein each test stream includes test frames including a unique stream identifier for the test stream. The steps further include receiving the test streams on the ports, wherein the received test streams are scrambled across the ports, and determining a count of lost test frames for the LAG based on the stream identifiers included in the test frames in the received test streams. Y.1564 KPIs and SLAs are also determined.

At 1005, test results are displayed via a UI on the test device 200, including the Y.1564 KPIs for the LAG and indications of whether the SLA criteria are met.

Figure 11:
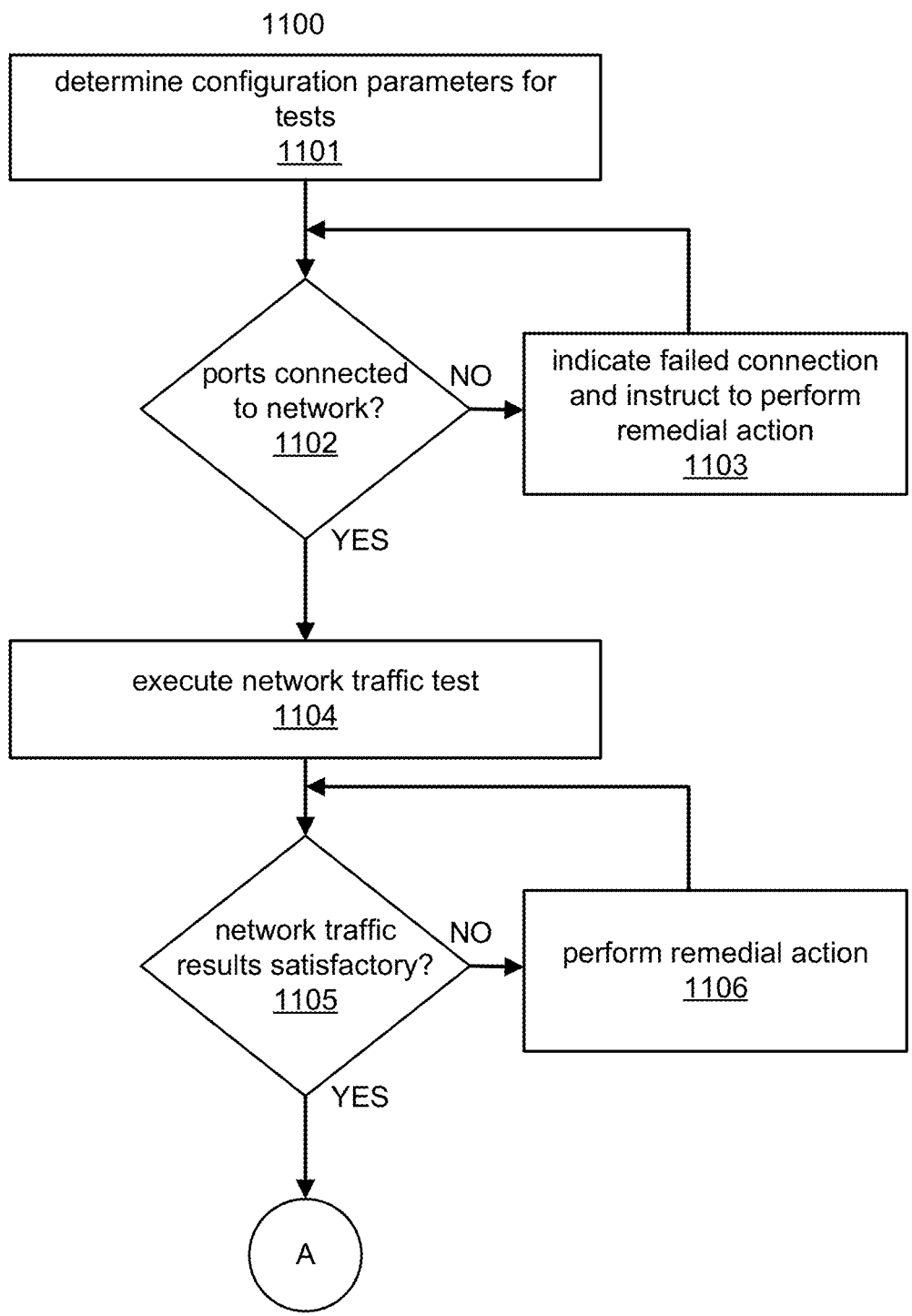
Figure 11:
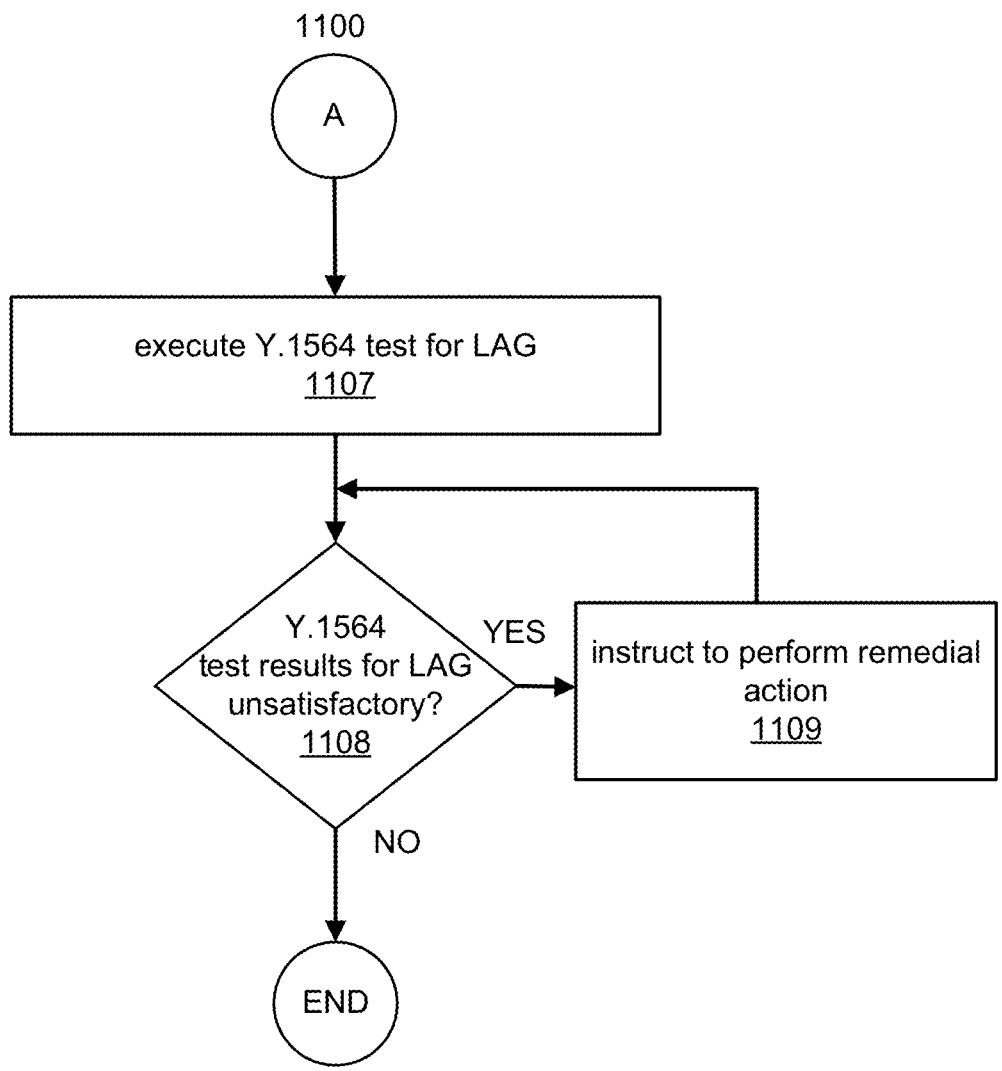

FIG. 11 shows a method 1100 for running multiple tests including a LAG application test, according to an example of the present disclosure. The method 1100 may include one or more of the steps of the method 1000. The method 1100 includes testing connectivity of the LAG which may include running a network traffic test and testing for RFC 2544 KPIs. The method also includes testing Y.1564 KPIs of of the LAG, and if a KPI fails, one or more ports of the LAG may be independently tested to identify the cause of the failure. To execute these tests, the test device 200 is connected to the network. For example, a network under test may include one of the networks shown in FIGS. 2A-B. In an example, to connect the test device 200 to the network, ports 210 of the test device 200 or ports of the pluggable transceiver 203 which is connected to a port of the test device 200 are connected to NID 111A or NID 111A' via the optical cable 205. After connecting the test device 200 to the network, the method 1100 may be performed.

At 1101, configuration parameters are determined for running the tests of the method 1100. The configuration parameters are stored in the test device 200. The configuration parameters include the number of ports and identification of the ports for the LAG.

The configuration parameters may further include a type of service to be tested for the network traffic test. For example, as shown in FIG. 7A, a user selects a 4×10 GE Ethernet Layer 2 traffic test. Other types of network traffic tests may be selected as shown in FIG. 7A. For example, instead of 4×10 GE, other types of service to be tested may include 20 GE, 40 GE, 1 GE optical, etc. Also, the number of ports may differ from four, such as 2×20 GE, etc., but the ports identified for the LAG are tested for the network traffic test. Also, the network layer for the test may be Layer 3 or Layer 4 instead of Layer 2. Also, source and destination addresses for the network traffic test can be configured. The address of a remote test device to provide loopback is also configured so a command to place the remote test device in loopback mode may be sent from the test device 200.

FIGS. 8A-D show examples of UIs that may be used to configure parameters for the network traffic test which may include testing for RFC 2544 KPIs. FIG. 8A shows selecting ports and a bit rate for each port for testing. FIG. 8D shows validating KPIs for throughput, frame loss, latency and jitter for one of the four streams. Thresholds may be set for the KPIs to provide a basis for determining pass or fail for each KPI.

The configuration parameters may include parameters for Y.1564 testing and thresholds for Y.1564 KPIs such as shown in FIGS. 9B-C. FIG. 9B shows setting a CIR for each port. The test streams transmitted on each port may have class of service (CoS) profiles having different frame and bandwidth profiles such as the service's maximum transmission unit (MTU) or frame size, CIR, and EIR. These metrics can be set for each port. FIG. 9C shows setting SLA pass/fail parameters, e.g., throughput, frame loss ratio, frame delay, and delay variation.

At 1102, the test device 200 determines whether the ports for the LAG are connected to the network. For example, the test device 200 determines the ports are connected to the network based at least on detection of optical signals received via the ports at the test device. Assume ports 1-4 are being tested for connectivity to the network. The test device 200 determines whether optical signals are received via ports 1-4 at the test device 200. If so, the test device 200 displays that the ports are connected and a signal is present on the ports. In an example, such as shown in FIG. 8B, LEDs in a UI can indicate connectivity of the ports such as LEDs for Signal Present, Sync Acquired for the Ethernet link, and Link Active for the Ethernet link. The LEDs may be color coded. For example, if the LEDs are green that is a positive indication of connectivity. For example, in FIG. 8B, the LEDs indicate that for each of ports 1-4, the test device 200 has successfully connected to the network under test via each port and that the Ethernet link is active for each port.

If the test device 200 determines that it is not receiving an optical signal via any of the ports, at 1103, the test device 200 indicates a failed connection for each port determined not to be connected to the network and can instruct to perform a remedial action. For example, if an LED is red, it is a negative indication of connectivity in FIG. 8B. Also, the test display 200 may display instructions to remediate. Then, the technician can take remedial action to correct the failed connection at 1105 which may be based on instructions provided by the test device 200. In some cases, dust or debris on optical connectors may cause failed physical connection of the ports to the network under test. If an LED is red for a port, the test device 200 may instruct the technician via the UI to clean the fiber and connectors and run the test again at 1106.

At 1104, the network traffic test is executed. The test device 200 generates test frames to execute the network traffic test at 1107. For example, test packets including the test frames shown in FIG. 6 are transmitted from the test device 200 from the ports 1-4. Prior to transmitting the test packets, a remote test device may be put in loopback mode so the test device 200 receives the looped back test frames. The frame detect LED for each of the ports, as shown in FIG. 8C, indicates whether the test frames are being received by the test device via ports 1-4. Also, the test device 200 may determine whether RFC 2544 KPI thresholds are being met, e.g., frame rate, throughput (e.g., bit rate in Mbps), round trip delay, jitter, number of transmitted test frames and number of received test frames, etc. Examples are shown in FIGS. 8C-D. Test results are displayed. At 1105, the test device 200 determines whether the network traffic test results are satisfactory. For example, the test device 200 determines whether the test frames are detected for each port and/or whether RFC 2544 KPI thresholds are being met. If not, at 1106, the test device 200 displays instructions to perform a remedial action to correct the unsatisfactory test results.

After testing connectivity and performing a network traffic test, the test device 200 can execute a Y.1564 test for the LAG at 1107. Test results are displayed. If any of the test results are determined to be unsatisfactory at 1108, then the test device 200 displays instructions to perform a remedial action to correct the unsatisfactory test results at 1109. Unsatisfactory results may include Y.1564 KPIs or SLA thresholds, such as shown in FIG. 9E, not being met. Instructions to perform a remedial action may include instructions for further testing the network, such as to test for noise, signal level, etc. In an example, the instructions to perform a remedial action may include instructions to execute the Y.1564 test for one or more of the ports independently in a non-lag mode, and determine whether any of the KPIs do not meet the threshold. If so, then the link for the offending port may be further tested and/or remediated.

In an example, steps for executing the Y.1564 test for the LAG include transmitting a test stream from each of the ports, wherein each test stream includes test frames including a unique stream identifier for the test stream. The steps further include receiving the test streams on the ports, wherein the received test streams are scrambled across the ports, and determining a count of lost test frames for the LAG based on the stream identifiers included in the test frames in the received test streams. Y.1564 KPIs and SLAs are also determined.

One or more of the steps of the method 1100 may be optional. For example, even if a test result is determined to be unsatisfactory, the next test may still be executed regardless as long as the ports are determined to be connected to the network and are receiving test frames for test streams.

Also, the steps of the method 1100 can be provided as part of an automated workflow for a technician using the test device 200 to test the LAG. Thus, a technician with limited experience may still be able to test the LAG based on the UIs generated in the automated workflow.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A test device connectable to a network to test network parameters, the test device comprising:
   a processing circuit; and
   a memory to store test results,
   wherein the processing circuit is to:
      configure ports for the test device for a link aggregation group (LAG);
      generate test frames to include in a test stream to be transmitted from each of the ports to test the LAG, wherein each test frame includes a unique, embedded stream identifier that is embedded in each packet of a corresponding test stream;
      transmit the test streams in the network from the ports;
      receive the test streams via the network on the ports, wherein the received test streams are hash-based load balanced across the ports; and
      determine a count of lost test frames for the LAG based on the unique, embedded stream identifiers included in the test frames in the received test streams.

2. The test device of claim 1, wherein the received test streams are looped back from a remote test device via the network.

3. The test device of claim 1, wherein the ports for the LAG comprise ports of optical pluggable transceiver connectable to a port of the test device.

4. The test device of claim 1, wherein the processing circuit measures key performance indicators for the LAG including at least one of frame loss ratio, frame delay, and frame delay variation.

5. The test device of claim 1, wherein the processing circuit measures key performance indicators for the LAG by suppressing out of sequence errors for the test frames in the received test streams.

6. The test device of claim 1, wherein to generate the test frames, the processing circuit is to include the unique, embedded stream identifier for the corresponding test stream in a payload of each test frame.

7. The test device of claim 1, wherein the test frames are transmitted in one of Layer 2, Layer 3 and Layer 4 packets.

8. The test device of claim 1, wherein the processing circuit verifies the ports are connected to the network prior to generating the test frames to test the LAG.

9. The test device of claim 1, wherein the processing circuit executes a Y.1564 test for each port independently in a non-lag mode responsive to determining a key performance indicator for a Y.1564 test for the LAG has failed.

10. The test device of claim 9, wherein the test device comprises a display to show test results for the Y.1564 test of each port independently and for the Y.1564 test for the LAG.

11. A portable test device connectable to a network to execute tests, the test device comprising:
    a battery;
    a processing circuit;
    a port; and
    a memory to store test results,
    wherein the processing circuit is to:
       test connectivity of ports for a link aggregation group (LAG);
       responsive to verifying the ports are connected to the network,
          execute an RFC 2544 test for each of the ports; and
          execute a Y.1564 test for the LAG, wherein to execute the Y.1564 test for the LAG includes:
             transmitting a test stream from each of the ports of the LAG, wherein each test stream includes test frames including a unique, embedded stream identifier that is embedded in each packet of the test stream;
             receiving the test streams on the ports, wherein the received test streams are hash-based load balanced across the ports; and
             determining a count of lost test frames for the LAG based on the unique, embedded stream identifiers included in the test frames in the received test streams.

12. The portable test device of claim 11, wherein the received test streams are looped back from a remote test device via the network.

13. The portable test device of claim 11, wherein the ports for the LAG comprise ports of optical pluggable transceiver connectable to the port of the test device.

14. The portable test device of claim 11, wherein the processing circuit measures key performance indicators for the LAG including at least one of frame loss ratio, frame delay, and frame delay variation.

15. The portable test device of claim 11, wherein to execute the Y.1564 test for the LAG, the processing circuit is to:
include the unique, embedded stream identifier of the test stream in payloads of the test frames for the test stream.

16. A method for testing a network with a test device, the method comprising:
determining configuration parameters for the testing, wherein the configuration parameters identify ports associated with the test device for link aggregation group (LAG) testing;
detecting whether the ports are connected to the network based at least on detection of optical signals received via the ports at the test device;
executing a network traffic test responsive to determining the ports are connected to the network, wherein the executing of the network traffic test includes generating and transmitting test frames via the ports and receiving the test frames looped back from a remote device via the ports; and
executing a Y.1564 test for the LAG, wherein the executing of the Y.1564 test for the LAG includes:
transmitting a test stream from each of the ports, wherein each test stream includes test frames including a unique, embedded stream identifier that is embedded in each packet of the test stream;
receiving the test streams on the ports, wherein the received test streams are hash-based load balanced across the ports; and
determining a count of lost test frames for the LAG based on the unique, embedded stream identifiers included in the test frames in the received test streams.

17. The method of claim 16, wherein the determining of the count of the lost test frames for the LAG comprises:
determining an amount of lost test frames for each of the received test streams based on the unique, embedded stream identifiers included in the test frames in the received test streams; and
totaling the amounts of lost test frames.

18. The method of claim 16, wherein the transmitting of the test stream from each of the ports comprises:
embedding the unique, embedded stream identifier for the test stream in payloads of the test frames included in the test stream.

19. The method of claim 16, wherein the executing of the Y.1564 test for the LAG comprises:
measuring key performance indicators for the LAG including at least one of frame loss ratio, frame delay, and frame delay variation.

20. The method of claim 16, wherein the received test streams are looped back from a remote test device via the network.

* * * * *